United States Patent
Akiyama et al.

(10) Patent No.: US 10,403,961 B2
(45) Date of Patent: Sep. 3, 2019

(54) ELECTRONIC APPARATUS

(71) Applicant: LENOVO (SINGAPORE) PTE. LTD., Singapore (SG)

(72) Inventors: Sara Akiyama, Yokohama (JP);
Shigekazu Hawaka, Yokohama (JP);
Masaaki Bandoh, Yokohama (JP);
Tsutomu Chonan, Yokohama (JP);
Tatsuya Ushioda, Yokohama (JP);
Kaneto Takeda, Yokohama (JP)

(73) Assignee: LENOVO (SINGAPORE) PTE. LTD., Singapore (SG)

(*) Notice: Subject to any disclaimer, the term of this patent is extended or adjusted under 35 U.S.C. 154(b) by 316 days.

(21) Appl. No.: 15/635,544

(22) Filed: Jun. 28, 2017

(65) Prior Publication Data

US 2018/0309185 A1 Oct. 25, 2018

(30) Foreign Application Priority Data

Apr. 20, 2017 (JP) .................... 2017-083440

(51) Int. Cl.
*H01Q 1/22* (2006.01)
*H04B 1/3827* (2015.01)
*H01Q 1/24* (2006.01)

(52) U.S. Cl.
CPC .......... *H01Q 1/2266* (2013.01); *H01Q 1/243* (2013.01); *H04B 1/3827* (2013.01)

(58) Field of Classification Search
CPC ........ H01Q 1/22; H01Q 1/243; H04B 1/3827; H04B 1/3833
See application file for complete search history.

(56) References Cited

U.S. PATENT DOCUMENTS

| | | | | |
|---|---|---|---|---|
| 8,068,059 | B2* | 11/2011 | Konishi | G06F 1/1616 343/702 |
| 9,122,446 | B2* | 9/2015 | Jervis | G06F 1/1616 |
| 2002/0149522 | A1 | 10/2002 | Hwang | |
| 2011/0080696 | A1* | 4/2011 | Nishikawa | G06F 1/1637 361/679.01 |

FOREIGN PATENT DOCUMENTS

| | | |
|---|---|---|
| JP | 2011-091744 A | 5/2011 |
| JP | 2012019497 A | 1/2012 |
| JP | 2014-029920 A | 2/2014 |
| JP | 2014-186839 A | 10/2014 |
| JP | 2017-046215 A | 3/2017 |

* cited by examiner

*Primary Examiner* — Dameon E Levi
*Assistant Examiner* — Hasan Z Islam
(74) *Attorney, Agent, or Firm* — Shimokaji IP (57) ABSTRACT

The present invention provides an electronic apparatus capable of securing satisfactory communication quality and thermal radiation in an antenna module. An electronic apparatus is equipped with a box-like body chassis in which an opening of a first chassis member is closed by a second chassis member. Further, the electronic apparatus is equipped with a metal-made bracket which has an antenna placement surface on which an antenna module transmitting and receiving radio waves is placed, and is fixed to an inner surface of the first chassis member, and a resin-made holding tool which holds the antenna module on the antenna placement surface.

7 Claims, 7 Drawing Sheets

ELECTRONIC APPARATUS

FIELD OF THE INVENTION

The present invention relates to an electronic apparatus equipped with an antenna.

BACKGROUND OF THE INVENTION

An electronic apparatus like a notebook personal computer (laptop PC) has heretofore been equipped with an antenna for wireless communication. A laptop PC with an antenna for wireless communication equipped in a display chassis has been disclosed in, for example, Patent Document 1.

[Patent Document 1] Japanese Patent Application Laid-Open No. 2012-19497

SUMMARY OF THE INVENTION

In such an electronic apparatus as described above, a frequency band thereof has been gradually made high in frequency for a further improvement in communication speed, etc. For example, a WiGig (Wireless Gigabit) standard is a 60 GHz-band wireless communication standard and a standard which is globally used as for short-distance high-speed digital wireless transmission. An antenna for this type of standard is strong in directivity and rectilinearity of radio waves and also large in the amount of heat generated in an antenna module. This type of antenna module is therefore required to be equipped in a chassis of the electronic apparatus with a sufficient radiation structure provided therein without the radio waves being shielded by a conductor in the transmission/reception direction thereof.

However, when this type of antenna module is equipped in the display chassis as in Patent Document 1 described above, the shielding of radio waves by a display as a conductor and the construction of a radiation structure within the thin display chassis come to problems. That is, when this type of antenna module is equipped in the display chassis, it is necessary to secure a predetermined interval between the display and the antenna module and install radiating components or the like within a chassis thin and small in space. As a result, the electronic apparatus has to, for example, widely configure a resin-made bezel member which covers a peripheral edge part of the display and leads to deterioration of its appearance quality.

The present invention has been made in view of the problems of the above related art. An object of the present invention is to provide an electronic apparatus capable of securing satisfactory communication quality and thermal radiation in an antenna module.

An electronic apparatus according to the first aspect of the present disclosure has a box-like chassis having chassis members one of which has an opening closed by the other thereof, a metal-made bracket having an antenna placement surface with an antenna module transmitting/receiving radio waves placed thereon and being fixed to an inner surface of the one chassis member, and a resin-made holding tool mounted to the bracket and holding the antenna module on the antenna placement surface.

The electronic apparatus according to the second aspect of the present disclosure may be a configuration in which a sheet-like member having a thermal conductive property is provided between the antenna placement surface and the antenna module.

The electronic apparatus according to the third aspect of the present disclosure may be a configuration in which the holding tool is a frame-like member formed with a hole part therein, and the antenna placement surface and the antenna module are disposed inside the hole part.

The electronic apparatus according to the fourth aspect of the present disclosure may be a configuration in which the chassis has electronic parts therein, the electronic parts are fixed to the inner surface of the one chassis member, and the antenna module is disposed at a position closer to an inner surface of the other chassis member than the inner surface of the one chassis member.

The electronic apparatus according to the fifth aspect of the present disclosure may be a configuration in which the other chassis member has a resin-made radio wave transmission part in at least a part thereof, the antenna module has a radio wave transmitting/receiving part at least at a back surface of a surface thereof opposite to the antenna placement surface, and the radio wave transmitting/receiving part is disposed opposite to the radio wave transmission part.

The electronic apparatus according to the sixth aspect of the present disclosure may be a configuration in which the antenna module is capable of transmitting and receiving radio waves in at least a range of 180° or more relative to a periphery of the radio wave transmitting/receiving part, and the one chassis member has a resin-made radio wave transmission part at least at a position overlapping the antenna module.

The electronic apparatus according to the seventh aspect of the present disclosure may be configured to be equipped with the chassis having a keyboard device on an upper surface of the one chassis member, and a display chassis having a display and openably/closably connected to the chassis through hinges.

According to the above-described aspects of the present disclosure, it is possible to ensure satisfactory communication quality and thermal radiation in an antenna module.

DETAILED DESCRIPTION OF THE INVENTION

An electronic apparatus according to the present invention will hereinafter be described in detail by a preferred embodiment while referring to the accompanying drawings.

Figure 1:
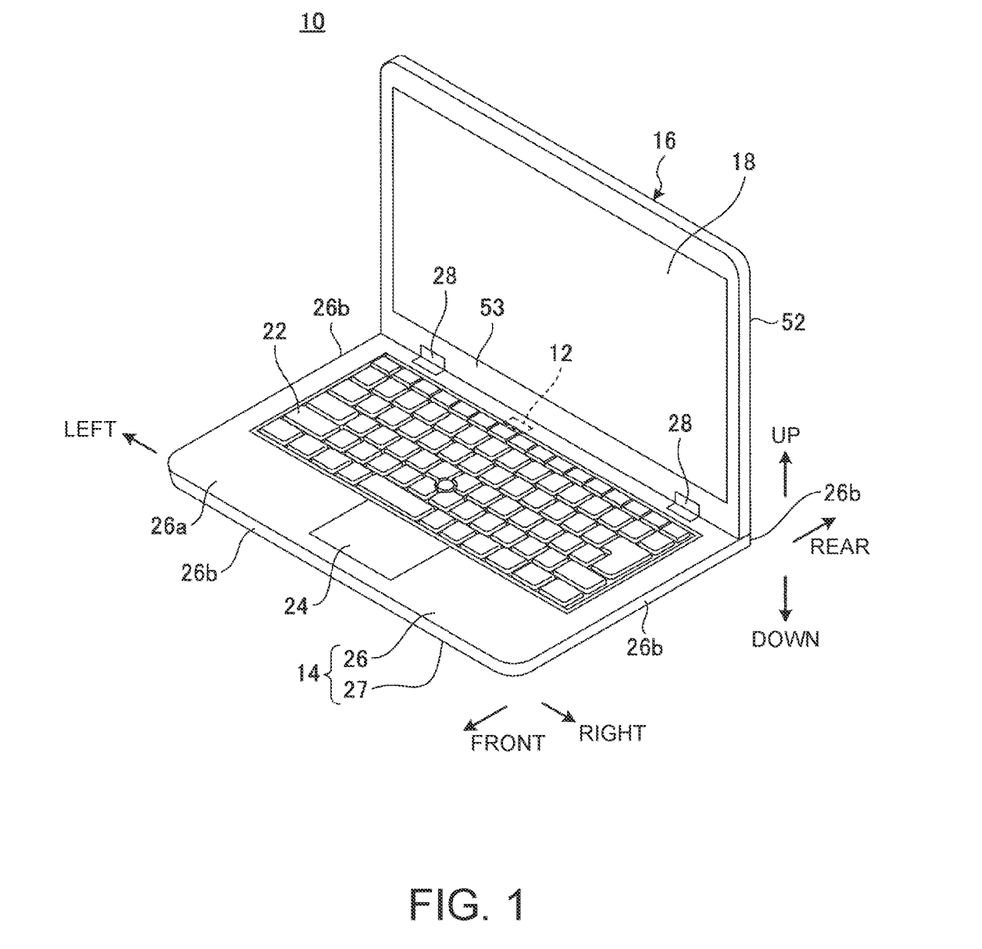
FIG. 1 is a perspective diagram of an electronic apparatus according to the present disclosure.

FIG. 1 is a perspective diagram of an electronic apparatus 10 according to the present disclosure. As illustrated in FIG. 1, the electronic apparatus 10 is equipped with a body chassis 14 mounted with an antenna module 12 to be an antenna for wireless communication, and a display chassis 16.

As illustrated in FIG. 1, the electronic apparatus 10 will hereinafter be described on the basis of a state in which a user visually recognizes a display 18 provided in the display chassis 16, while referring to the front side of the electronic apparatus 10 as front and to its deep side as rear, referring to the left side thereof as left and to the right side thereof as right in a widthwise direction of the body chassis 14, and referring to the upper side thereof as up and to the lower side thereof as down in a thickness direction of the body chassis 14.

The body chassis 14 is provided with a keyboard device 22 and a touch pad 24 at an upper surface thereof, and an antenna module 12 therein.

The body chassis 14 is formed of a first chassis member 26 on its upper side and a second chassis member 27 on its lower side in a flat box shape. The first chassis member 26 has an upper plate 26a which forms the upper surface of the body chassis 14, and four side plates 26b vertically suspended from the four peripheral edge parts of the upper plate 26a. The first chassis member 26 has a shape in which an upper surface thereof is lidded and a lower surface thereof is opened. The second chassis member 27 is a plate-like member which forms the lower surface of the body chassis 14, and serves as a cover member which closes an opening 26c (refer to FIG. 2) on the lower surface side of the first chassis member 26. The keyboard device 22 and the touch pad 24 are exposed to the upper surface of the body chassis 14 through openings provided in the upper plate 26a of the first chassis member 26.

The display chassis 16 is configured in a flat box shape thinner than that for the body chassis 14 and provided with the display 18 in its inner surface. The display chassis 16 has a lower end part thereof openably/closably coupled to a rear end part of the body chassis 14 through hinges 28. The display chassis 16 is electrically connected to the body chassis 14 by unillustrated cables which pass through the hinges 28.

The electronic apparatus 10 according to the present disclosure is a clamshell structure capable of opening/closing the display chassis 16 from a 0° position where the display chassis 16 is superposed on the body chassis 14, to a 180° position where the display chassis 16 is opened from the body chassis 14 until it becomes parallel therewith. The electronic apparatus 10 may be a structure capable of opening/closing the display chassis 16 to a 360° position where the display chassis 16 is inverted to the lower surface side of the body chassis 14.

Figure 2:
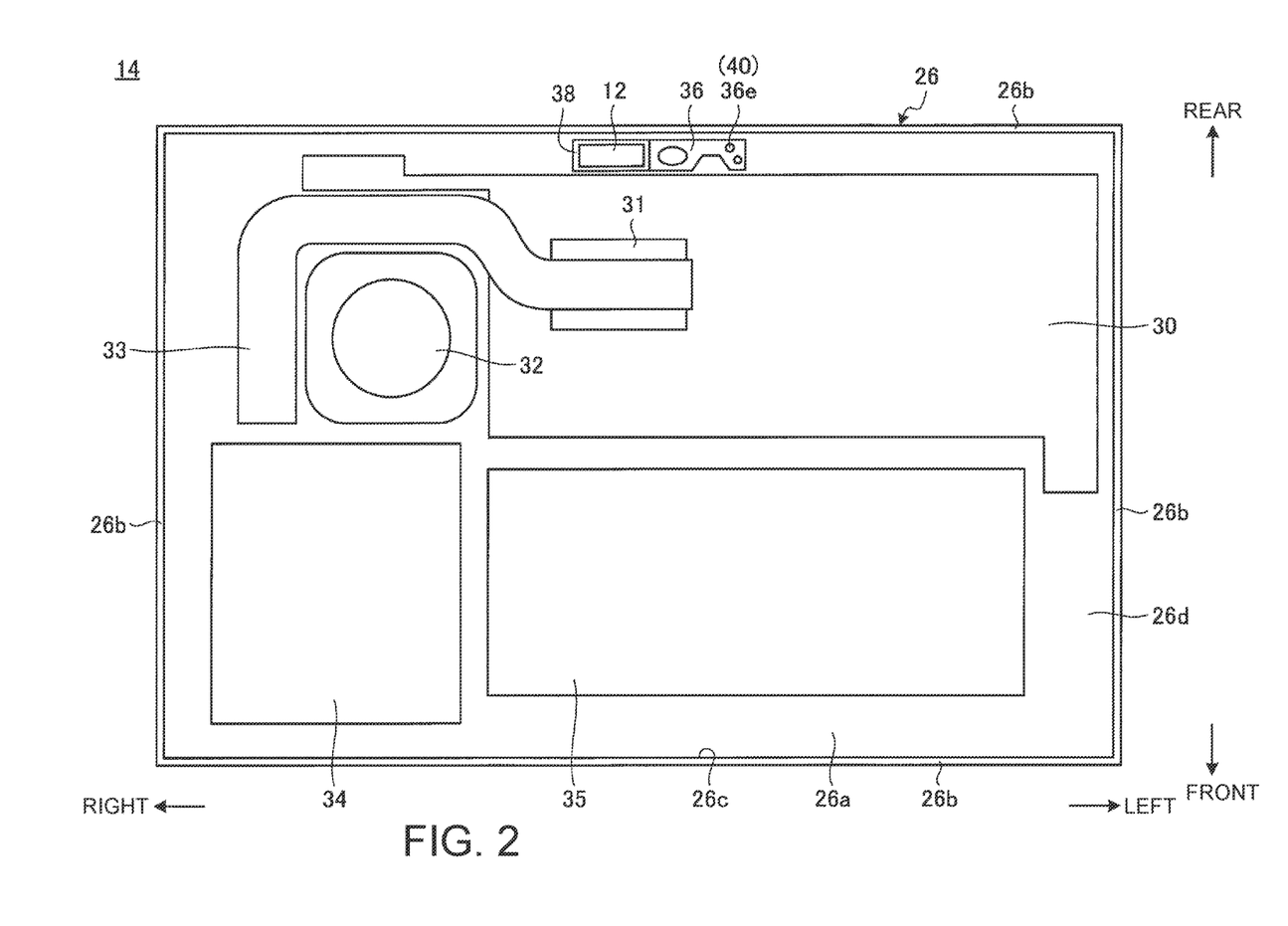
FIG. 2 is a diagram typically illustrating a configuration example of an internal structure of a body chassis in the present disclosure.

FIG. 2 is a diagram typically illustrating a configuration example of an internal structure of the body chassis 14 in the present disclosure and is a diagram of the first chassis member 26 from which the second chassis member 27 is detached, as seen from its lower surface side.

As illustrated in FIG. 2, the body chassis 14 accommodates therein various electronic parts such as a substrate 30, a CPU (Central Processing Unit) 31, a cooling fan 32, a heat pipe 33, an HDD (hard disk) device 34, and a battery device 35. These electronic parts are attached and fixed to an inner surface 26d of the first chassis member 26.

The electronic apparatus 10 assumes that the user detaches the second chassis member 27 from the first chassis member 26 for maintenance work such as extension of an unillustrated memory device, etc. To this end, in the electronic apparatus 10, the electronic parts such as the substrate 30, etc. equipped inside the body chassis 14 are fixed to the inner surface 26d of the first chassis member 26. Thus, the body chassis 14 has a structure in which wires or the like do not extend between the first chassis member 26 and the second chassis member 27. The second chassis member 27 is attached to or detached from the first chassis member 26 by using, for example, prescribed screws or an engagement structure.

The antenna module 12 is disposed substantially in the center of the rear end part within the body chassis 14. The antenna module 12 has a specification based on, for example, the WiGig standard and performs transmission/reception of radio waves in a wireless communication of a 60 GHz band, for example.

Figure 3:
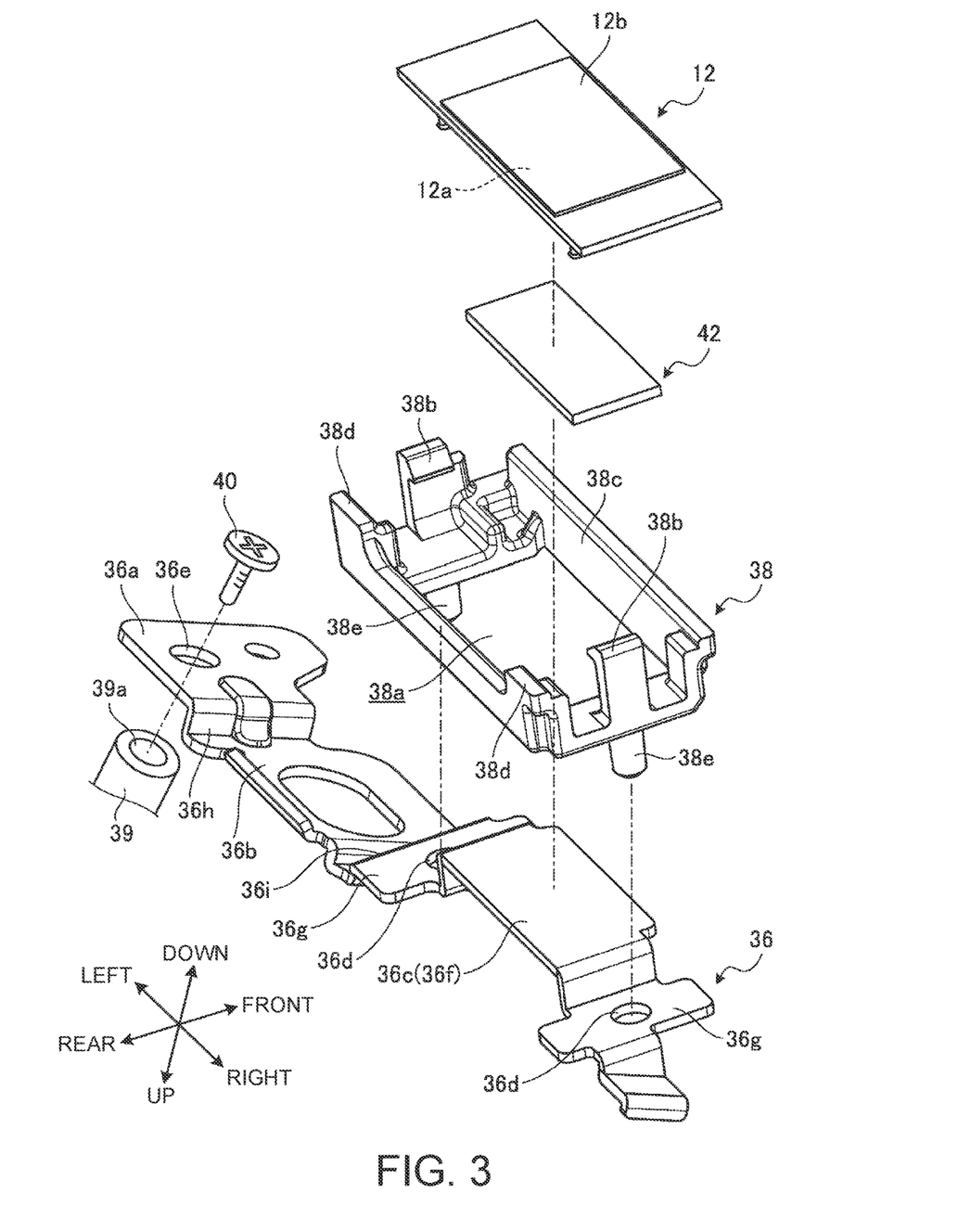
FIG. 3 is an exploded perspective diagram illustrating an attachment structure of an antenna module in the present disclosure.
Figure 4:
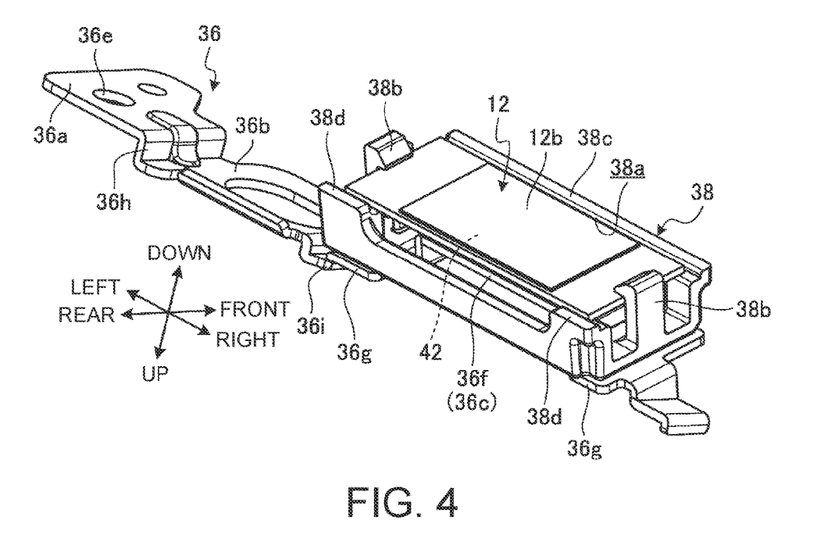
FIG. 4 is a perspective diagram illustrating the attachment structure of the antenna module in the present disclosure.
Figure 5:
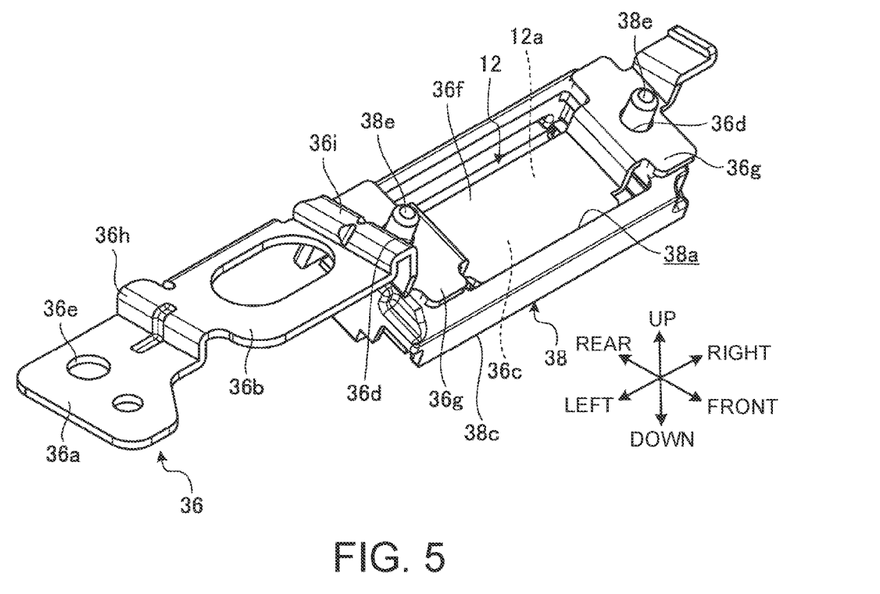
FIG. 5 is a perspective diagram illustrating a state of the antenna module illustrated in FIG. 4 as seen from its back.
Figure 6:
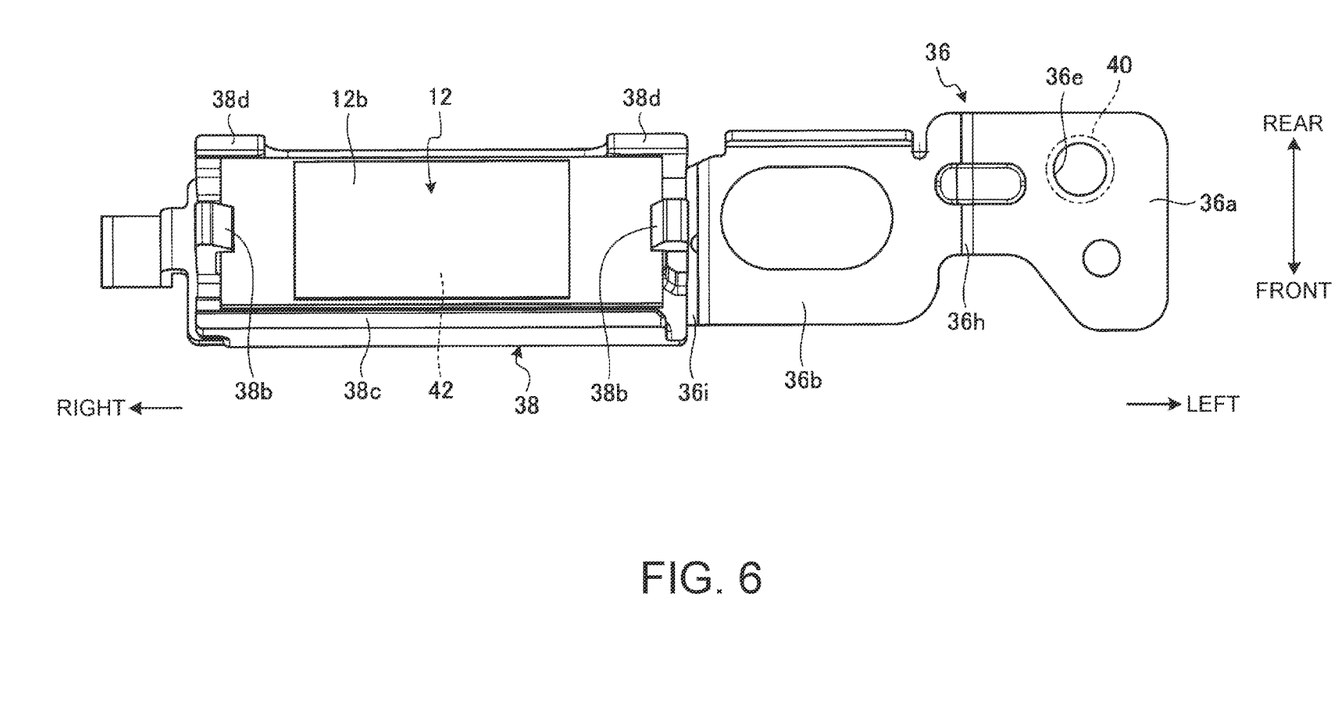
FIG. 6 is a plan diagram of the antenna module illustrated in FIG. 4.

FIG. 3 is an exploded perspective diagram illustrating an attachment structure of the antenna module 12 in the present disclosure. FIG. 4 is a perspective diagram illustrating the attachment structure of the antenna module 12 in the present disclosure. FIG. 5 is a perspective diagram illustrating a state in which the antenna module 12 illustrated in FIG. 4 is seen from its back. FIG. 6 is a plan diagram of the antenna module 12 illustrated in FIG. 4.

As illustrated in FIGS. 2 through 6, the antenna module 12 is attached and fixed to the inner surface 26d of the first chassis member 26 through a bracket 36 and a holding tool 38.

The bracket 36 is a metallic sheet plate part. The bracket 36 is formed of a metal like aluminum or copper, which is high in thermal conductivity. The bracket 36 has an attachment part 36a, a bridge part 36b, an antenna placement surface 36c, and a pair of mounting holes 36d and 36d.

The attachment part 36a is a flat plate attached and fixed to the inner surface 26d of the first chassis member 26. For example, the attachment part 36a is arranged in contact with the top surface of a boss 39 having a female screw 39a and protruded from the inner surface 26d (refer to FIG. 3). The attachment part 36a has a throughhole 36e. A screw part of a screw 40 (refer to FIG. 6) fastened to the female screw 39a is inserted through the through hole 36e.

The bridge part 36b is a plate part which connects between the attachment part 36a, the antenna placement surface 36c, and the mounting hole 36d. The bridge part 36b is disposed at a position located above the attachment part 36a, the antenna placement surface 36c, and the mounting hole 36d. The bridge part 36b is a flat plate installed parallel to the inner surface 26d. The bridge part 36b may be omitted.

The antenna placement surface 36c is a flat surface on which the antenna module 12 is placed. In the present disclosure, the antenna module 12 is placed on the antenna placement surface 36c through a thermal conductive sheet 42 interposed therebetween. The antenna placement surface 36c is disposed at a position protruded below the attachment part 36a, the bridge part 36b, and the mounting hole 36d. The antenna placement surface 36c is a surface formed in a flat plate 36f inclined vertically with respect to the inner surface 26d.

The thermal conductive sheet 42 is a sheet-like member having high thermal conductivity. The thermal conductive sheet 42 is a part for bringing close contact between the antenna module 12 and the antenna placement surface 36c and ensuring satisfactory heat transfer from the antenna module 12 to the antenna placement surface 36c. The thermal conductive sheet 42 is formed of, for example, a rubber sheet (thermal rubber sheet) having high thermal conductivity.

The pair of mounting holes 36d and 36d is provided right and left across the antenna placement surface 36c. The mounting holes 36d are respectively throughholes formed in flat plates 36g parallel to the antenna placement surface 36c. An axial direction of each mounting hole 36d is in parallel to a vertical direction of the antenna placement surface 36c.

The bracket 36 has a crank-shape part 36h bent vertically between the bridge part 36b and the attachment part 36a and has a crank-shape part 36i twisted in up-and-down and back-and-forth directions between the bridge part 36b and the mounting hole 36d (flat plate 36g). Further, the flat plate 36f formed with the antenna placement surface 36c is protruded below the flat plate 36g with each mounting hole 36d defined therein. Thus, the bracket 36 is disposed in an attitude that the antenna placement surface 36c is inclined with respect to the attachment part 36a and at a lowermost position. Further, since the bracket 36 has a shape bent in a vertical direction with respect to its longitudinal direction (horizontal direction), the bracket 36 has sufficient strength and rigidity even though being comprised of a thin plate.

The holding tool 38 is a resin-made frame-like member having radio wave transmissivity. The holding tool 38 has a hole part 38a, a pair of claw parts 38b and 38b, a side wall part 38c, a pair of side wall parts 38d and 38d, and a pair of fitting pins 38e and 38e.

The hole part 38a is an inside opening of the holding tool 38 which is a frame-like member. The antenna placement surface 36c is inserted into the hole part 38a from above. The thermal conductive sheet 42 and the antenna module 12 are inserted therein from below. That is, the antenna module 12 is placed on the antenna placement surface 36c through the thermal conductive sheet 42 within the hole part 38a.

The pair of claw parts 38b and 38b is disposed opposite to each other with the hole part 38a interposed therebetween from side to side. The claw parts 38b are hooks respectively engaged with the right and left edges of the antenna module 12 inserted and disposed within the hole part 38a. Since each claw part 38b is provided atop of a resin-made narrow width plate, it is elastically displaced. Thus, the claw parts 38b can easily be engaged with the antenna module 12.

The side wall part 38c is a front wall of the hole part 38a. The pair of side wall parts 38d and 38d is disposed opposite to the side wall part 38c and is a rear wall of the hole part 38a. The side wall parts 38d may be an integral structure. The side wall parts 38d in the present disclosure are provided in pair so as to be spaced right and left apart from each other. Therefore, a clearance for inserting fingers or a tool to attach and detach the antenna module 12 is formed between the side wall parts 38d and 38d. These side wall parts 38c and 38d are parts which hold forward/rearward the antenna module 12 vertically and horizontally held between both the claw parts 38b and 38b and the antenna placement surface 36c.

The pair of fitting pins 38e and 38e is engageable with the pair of mounting holes 36d and 36d of the bracket 36 respectively. The holding tool 38 is disposed in such a manner that the lower surfaces of right and left frame members thereof provided with the fitting pins 38e are abutted on the flat plates 36g of the bracket 36. At this time, each fitting pin 38e is fit in the mounting hole 36d. Thus, the holding tool 38 is attached and fixed to the bracket 36.

In the electronic apparatus 10, the antenna module 12 is mounted onto the bracket 36 by causing the holding tool 38 fixed to the bracket 36 to hold the thermal conductive sheet 42 and the antenna module 12. That is, the antenna module 12 is held by the bracket 36 and the holding tool 38 with its lower surface supported by the antenna placement surface 36c and its upper surface supported by the claw parts 38b. At this time, the antenna module 12 is tightly adhered onto the antenna placement surface 36c through the thermal conductive sheet 42. Therefore, heat generated in the antenna module 12 is smoothly radiated from the antenna placement surface 36c to the whole metal-made bracket 36. That is, the bracket 36 combines a function as an attaching tool of the antenna module 12 and a function as a radiating tool thereof.

Further, in the antenna module 12 mounted to the bracket 36, a periphery other than a mounting surface 12a opposite to the antenna placement surface 36c is surrounded by the resin-made holding tool 38 having the radio wave transmissivity. Therefore, the radio waves can be transmitted and received in and from respective directions other than the mounting surface 12a side. In particular, the antenna module 12 has a radio wave transmitting/receiving part 12b at the back surface of the mounting surface 12a. The radio wave transmitting/receiving part 12b is, for example, an antenna pattern which actually transmits and receives the radio waves through the antenna module 12. The radio wave transmitting/receiving part 12b is capable of transmitting and receiving the radio waves in at least a wide range of 180° or more relative to its periphery. Incidentally, though the antenna module 12 in the present disclosure has an antenna pattern even at the mounting surface 12a, the present pattern is substantially shielded by the antenna placement surface 36c which serves as a conductor.

Figure 7A:
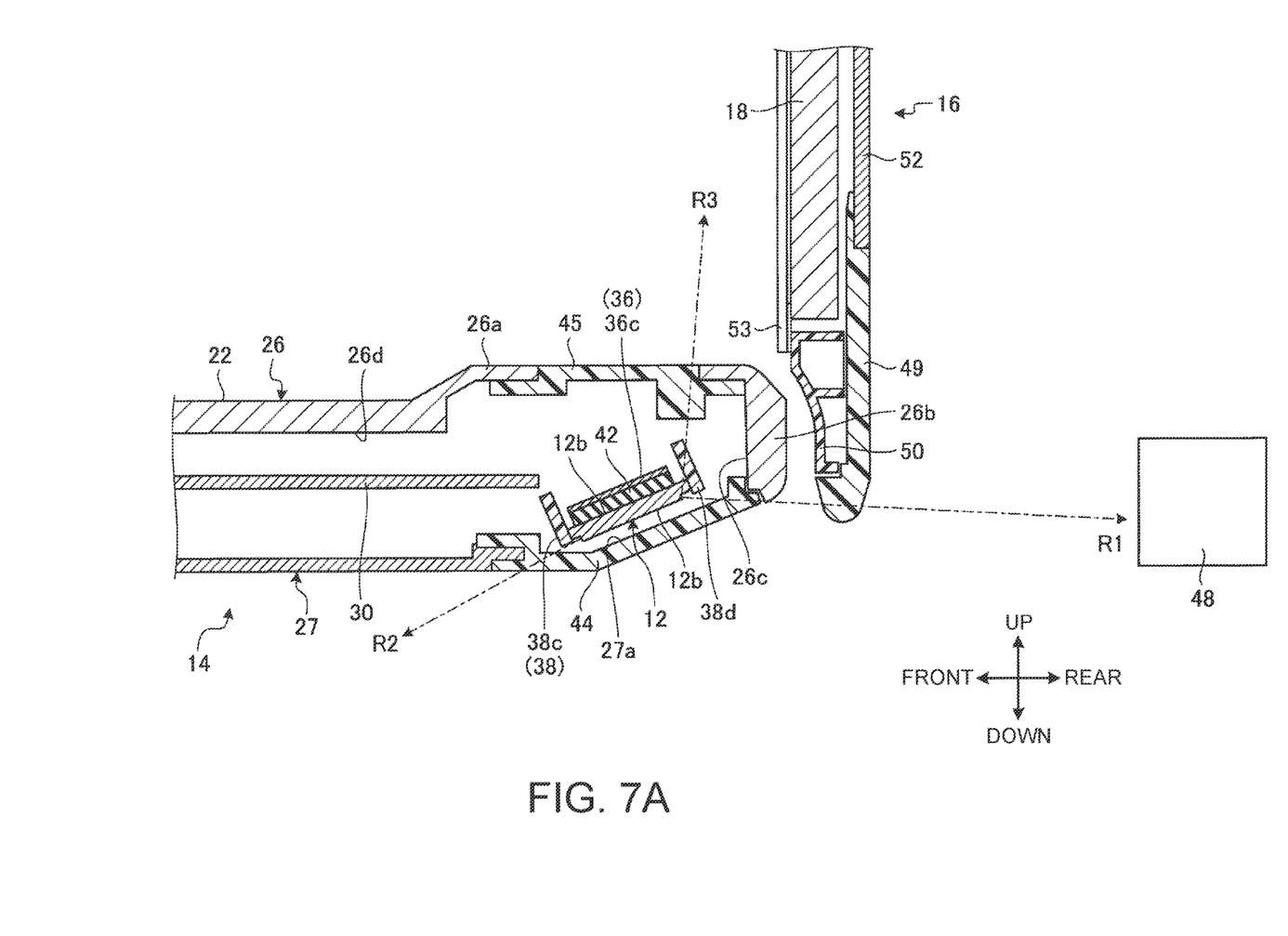
FIG. 7A is a sectional side diagram typically illustrating a rear end part of the electronic apparatus according to the present disclosure and a peripheral part thereof in an enlarged form.
Figure 7B:
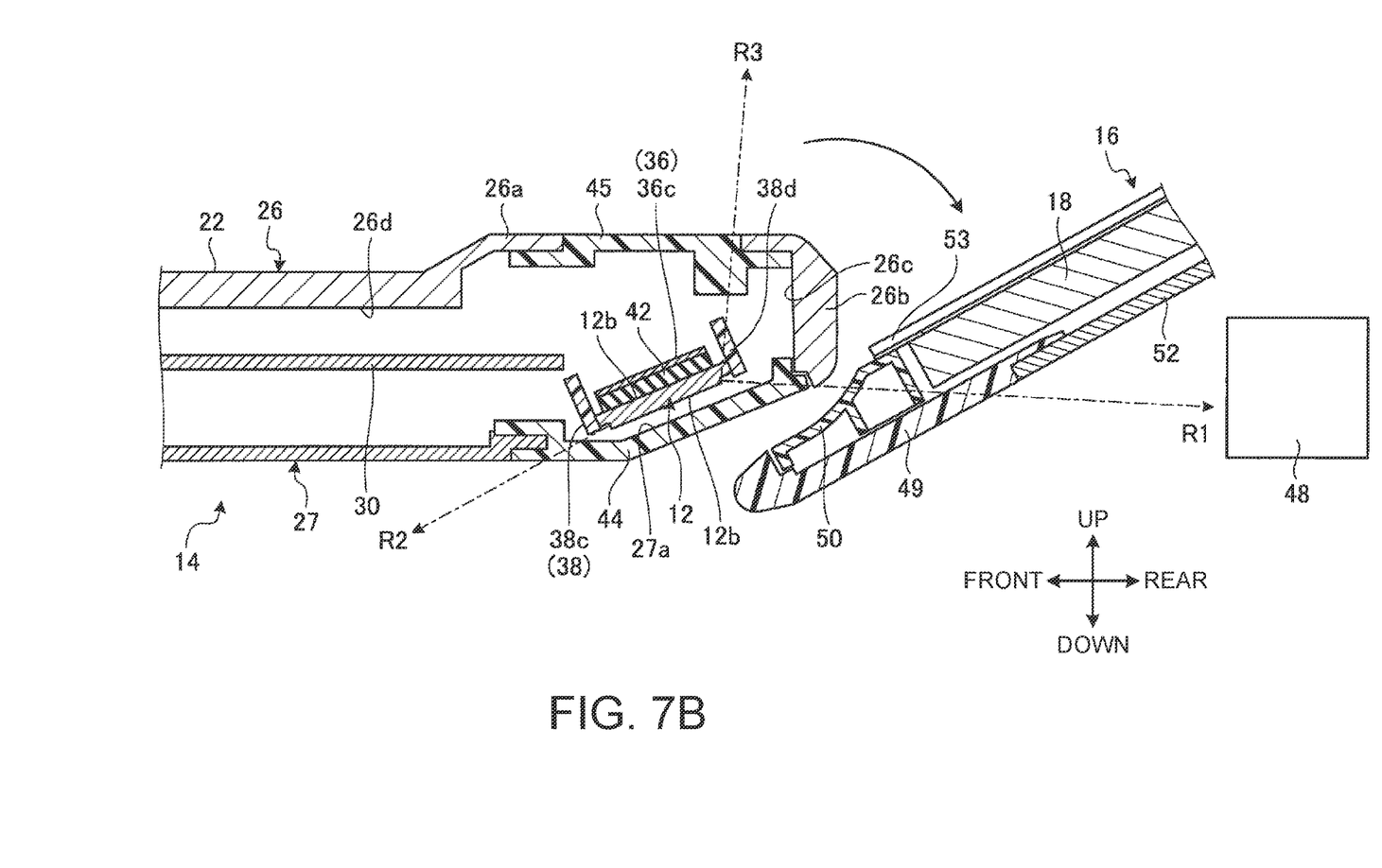
FIG. 7B is a sectional side diagram in a state in which the angle of a display chassis of the electronic apparatus illustrated in FIG. 7A is changed.

FIG. 7A is a sectional side diagram typically illustrating a rear end part of the electronic apparatus 10 according to the present disclosure and a peripheral part thereof in an enlarged form. FIG. 7B is a sectional side diagram in a state in which the angle of the display chassis 16 of the electronic apparatus 10 illustrated in FIG. 7A is changed. Incidentally, FIG. 7A illustrates a state in which an angular position of 90° is set between the body chassis 14 and the display chassis 16, and FIG. 7B illustrates a state in which an angular position of 150° is set between the body chassis 14 and the display chassis 16.

As illustrated in FIGS. 7A and 7B, the antenna module 12 is disposed at the rear end part of the body chassis 14 within the body chassis 14. With the antenna module 12 being attached and fixed to the bracket 36 fixed to the inner surface 26d of the first chassis member 26, the antenna module 12 is installed in an attitude where the radio wave transmitting/receiving part 12b faces rearward and obliquely downward. Further, the antenna module 12 is mounted to the antenna placement surface 36c disposed lowest at the bracket 36. Therefore, the antenna module 12 is disposed at a position where the radio wave transmitting/receiving part 12b is closer to the inner surface 27a of the second chassis member 27 than the inner surface 26d of the first chassis member 26. That is, the antenna module 12 is disposed at a position close to an opening edge of the opening 26c of the first chassis member 26. Thus, in the antenna module 12, at least the radio wave transmitting/receiving part 12b located at its lower surface is disposed at the same position as the lower surface of various electronic parts such as the substrate 30, etc. fixed to the inner surface 26d or a position where it extends downward therefrom. As a result, the radio waves from the radio wave transmitting/receiving part 12b of the antenna module 12 are suppressed from being shielded by the electronic parts such as the substrate 30, etc.

In the electronic apparatus 10, the second chassis member 27 is a metal-made plate-like member whose most part is formed of aluminum or magnesium or the like. Thus, the second chassis member 27 has a radio wave transmission part 44 having radio wave transmissivity at a position opposite to the antenna module 12, specifically, a position at a rear end part thereof, where it overlaps with the antenna module 12. The radio wave transmission part 44 is a resin-made plate-like member joined to a metal plate portion of the second chassis member 27. Thus, the antenna module 12 is capable of transmitting and receiving radio waves in an angular range of the radio waves passing through the radio wave transmission part 44 from a rear edge part of the radio wave transmitting/receiving part 12b to a front edge part thereof. That is, the radio wave transmitting/receiving part 12b is capable of satisfactorily transmitting and receiving the radio waves in an angular range extending from a radio wave R1 indicated by a dash line in FIG. 7 to a radio wave R2 via the radio wave transmission part 44. Though the radio wave transmitting/receiving part 12b of the antenna module 12 is disposed opposite to the radio wave transmission part 44 so as to be parallel therewith in FIGS. 7A and 7B, the two may be made opposite with a certain degree of tilt without facing the two in parallel.

Further, the first chassis member 26 is a metal-made plate-like member whose most part is formed of aluminum, magnesium or the like. The first chassis member 26 has a radio wave transmission part 45 having radio wave transmissivity at the position of the upper plate 26a, which is opposite to the antenna module 12, specifically, a position at a rear end part of the upper plate 26a, where it overlaps with the antenna module 12. The radio wave transmission part 45 is a resin-made plate-like member joined to a metal plate portion of the first chassis member 26. Thus, the antenna module 12 is capable of transmitting and receiving radio waves in an angular range of the radio waves passing through the radio wave transmission part 45 from the rear edge part of the radio wave transmitting/receiving part 12b positionally displaced from the antenna placement surface 36c. That is, the radio wave transmitting/receiving part 12b is capable of satisfactorily transmitting and receiving the radio waves at a radio wave R3 indicated by a dash line in FIG. 7 and its periphery.

As described above, the antenna module 12 in the present disclosure corresponds to wireless communication which handles a high frequency band based on the WiGig standard. The radio waves have directivity and rectilinearity. Further, for example, an extension device (WiGig dock) 48 wirelessly connected via the antenna module 12 is disposed rearwardly of the electronic apparatus 10.

However, when the electronic apparatus 10 is used, the display chassis 16 is disposed rearwardly of the body chassis 14 (refer to FIGS. 7A and 7B). Thus, as illustrated in FIGS. 7A and 7B, the electronic apparatus 10 has radio wave transmission parts 49 and 50 even at the lower end part of the display chassis 16. Each of the radio wave transmission parts 49 and 50 is a resin-made member having radio wave transmissivity. The radio wave transmission part 49 is joined to a lower end part of a back plate 52 of the display chassis 16. The radio wave transmission part 50 is disposed on the lower side of the display 18 and joined to a bezel member 53 of the display 18.

Thus, for example, the radio wave R1 which wirelessly connects between the radio wave transmitting/receiving part 12b of the antenna module 12 and the extension device 48 excellently passes through the respective radio wave transmission parts 44, 49, and 50. As a result, the electronic apparatus 10 is capable of obtaining satisfactory quality of wireless communication with the extension device 48.

As described above, the electronic apparatus 10 of the present disclosure is equipped with the box-like body chassis 14 in which the opening 26c of the first chassis member 26 is closed by the second chassis member 27. Further, the electronic apparatus 10 is equipped with the metal-made bracket 36 which has the antenna placement surface 36c on which the antenna module 12 transmitting/receiving the radio waves is placed, and is fixed to the inner surface 26d of the first chassis member 26, and the resin-made holding tool 38 which is mounted to the bracket 36 and holds the antenna module 12 on the antenna placement surface 36c.

Thus, the electronic apparatus 10 has the antenna module 12 installed in the body chassis 14 through the metal-made bracket 36. Therefore, in the antenna module 12, the heat generated therein is diffused and efficiently radiated through the metal-made bracket 36. Further, the antenna module 12 is held by the resin-made holding tool 38 in the state of being placed on the antenna placement surface 36c of the bracket 36. For this reason, the antenna module 12 is not greatly impeded in communication quality by the bracket 36. As a result, the electronic apparatus 10 is capable of ensuring satisfactory communication quality.

The holding tool 38 is a frame-like member formed therein with the hole part 38a. Then, the antenna placement surface 36c and the antenna module 12 are disposed inside the hole part 38a. Therefore, the antenna module 12 is reliably positioned and held on the antenna placement surface 36c. Further, since the antenna module 12 is not provided with the conductor at its periphery other than the mounting surface 12a on the antenna placement surface 36c side, satisfactory communication quality is obtained.

The body chassis 14 has the electronic parts such as the substrate 30, etc. therein, and the electronic parts such as the substrate 30, etc. are fixed to the inner surface 26d of the first chassis member 26. Further, the antenna module 12 is disposed at the position closer to the inner surface 27a of the second chassis member 27 than the inner surface 26d of the first chassis member 26. Thus, the antenna module 12 is not buried between other electronic parts such as the substrate 30, etc. fixed to the inner surface 26d within the body chassis 14. As a result, the electronic apparatus 10 can ensure more satisfactory communication quality. Besides, the bracket 36 is fixed to the inner surface 26d of the first chassis member 26 together with the substrate 30, etc. to be other electronic parts. Therefore, the wires extending between the chassis members 26 and 27 can be reduced or eliminated. Thus, the user is able to attach and detach the second chassis member 27 to and from the first chassis member 26 smoothly and easily. As a result, the electronic apparatus 10 is not limited in maintainability and extension function.

The electronic apparatus 10 is equipped with the body chassis 14 having the keyboard device 22 on the upper surface of the first chassis member 26, and the display chassis 16 having the display 18 and openably/closably coupled to the body chassis 14 through the hinges 28. Thus, the electronic apparatus 10 is not provided with the antenna module 12 within the display chassis 16. Therefore, the bezel member 53 of the display chassis 16 can be configured as narrow in width as possible, and hence the quality of appearance of the electronic apparatus 10 is enhanced.

Incidentally, the present invention is not limited to the above-described embodiment, but may, of course be freely modified within the scope not departing from the gist of the present invention.

Although the electronic apparatus 10 like the Laptop PC has been exemplified above, the present invention may be applied to other electronic apparatuses, for example, a tablet personal computer, a smart phone, etc. Further, the antenna module 12 may be of a specification corresponding to a standard other than the WiGig standard.

In the above, the antenna module 12 has been fixed to the first chassis member 26 through the bracket 36. However, for example, when the electronic apparatus 10 is configured to fix the electronic parts such as the substrate 30, etc. to the inner surface 27a of the second chassis member 27, the antenna module 12 is preferably fixed to the inner surface 27a of the second chassis member 27 through the bracket 36 and disposed at the position close to the inner surface 27a thereof.

The above description has exemplified the configuration in which the antenna module 12 is disposed in proximity to the inner surface 27a of the second chassis member 27. The antenna module 12 may, however, be arranged closer to the inner surface 26d of the first chassis member 26 than the inner surface 27a of the second chassis member 27.

We claim:

1. An electronic apparatus comprising:
   a box-shaped chassis having a first chassis member and a second chassis member,
   wherein the first chassis member has an opening that is closed by the second chassis member;
   a metal-made bracket having an antenna placement surface with an antenna module transmitting and receiving radio waves, the antenna module being on the antenna placement surface and being fixed to an inner surface of the second chassis member; and
   a resin-made holding tool including sidewalls mounted to the bracket for holding the antenna module on the antenna placement surface.

2. The electronic apparatus according to claim 1, wherein a sheet member having a thermal conductive property is between the antenna placement surface and the antenna module.

3. The electronic apparatus according to claim 1, wherein the holding tool is a frame member formed with a hole part therein, and wherein the antenna placement surface and the antenna module are disposed inside the hole part.

4. The electronic apparatus according to claim 1, wherein the chassis has electronic parts therein, and the electronic parts are fixed to an inner surface of the first chassis member, and
   wherein the antenna module is disposed at a position closer to an inner surface of the second chassis member than an inner surface of the first chassis member.

5. The electronic apparatus according to claim 4, wherein the second chassis member has a resin-made radio wave transmission part in at least a part thereof, and
   wherein the antenna module has a radio wave transmitting and receiving part at least at a back surface thereof and opposite to an antenna placement surface thereof, and the radio wave transmitting and receiving part is disposed opposite to the radio wave transmission part.

6. The electronic apparatus according to claim 5, wherein the antenna module is capable of transmitting and receiving radio waves in at least a range of 180° or more relative to a periphery of the radio wave transmitting/receiving part, and
   wherein the first chassis member has a resin-made radio wave transmission part at least at a position overlapping the antenna module.

7. The electronic apparatus according to claim 1, further comprising:
   a keyboard device on an upper surface of the first chassis member, and
   a display chassis having a display openably and closably connected to the chassis through hinges.

* * * * *